Figure 1:
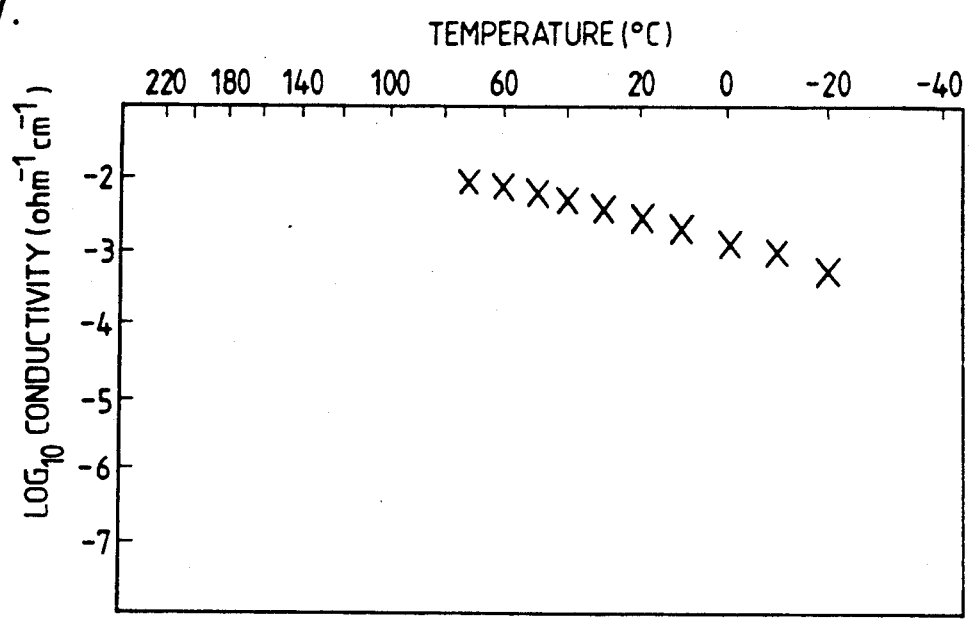

United States Patent [19]

North

[11] Patent Number: 5,085,952
[45] Date of Patent: Feb. 4, 1992

[54] SOLID STATE CELL ELECTROLYTE

[75] Inventor: John M. North, Compton, United Kingdom

[73] Assignee: Gould Inc., Eastlake, Ohio

[21] Appl. No.: 642,136

[22] Filed: Jan. 15, 1991

Related U.S. Application Data

[63] Continuation of Ser. No. 421,085, Oct. 13, 1989, abandoned, which is a continuation of Ser. No. 151,152, Feb. 1, 1988, abandoned.

[30] Foreign Application Priority Data

Feb. 18, 1987 [GB] United Kingdom ............... 8703736
Feb. 26, 1987 [GB] United Kingdom ............... 8720140

[51] Int. Cl.⁵ .......................................... H01M 10/40
[52] U.S. Cl. .................................... 429/192; 429/197
[58] Field of Search ................... 429/192, 194, 197

[56] References Cited

U.S. PATENT DOCUMENTS 4,547,440 10/1985 Hooper et al. ..................... 429/192
4,578,326 3/1986 Armand et al. .................... 429/192
4,740,498 4/1988 Lu ...................................... 429/197

FOREIGN PATENT DOCUMENTS 0145498 6/1985 European Pat. Off. ............ 429/192
0170463 10/1982 Japan ................................. 429/197

OTHER PUBLICATIONS

"Ethylene Carbonate-Propylene Carbonate Mixed Electrolytes for Lithium Batteries", S. Tobishima et al., *Electrochimica Acta.*, vol. 29, No. 2, pp. 267-271, 1984.

Primary Examiner—Stephen J. Kalafut
Attorney, Agent, or Firm—Michael A. Centanni

[57] ABSTRACT

A solid polymer electrolyte for a solid state electrochemical cell comprises a complex of a solid polymer such as poly(ethene oxide) and an alkali metal salt such as $LiCLO_4$, which polymer is capable of forming donor: acceptor type bonds with alkali metal ions and is capable of conducting alkali metal ions, the complex being associated with a mixture of more than one 1,3-dioxolane-2-ones, for example ethylene carbonate and propylene carbonate, such that the electrolyte possesses satisfactory ambient temperature ionic conductivity (e.g. $10^{-3}$ to $10^{-4}$ $ohm^{-1}$ $cm^{-1}$) and a cell including the electrolyte substantially maintains its discharge capacity at ambient temperature after repeated charge/discharge cycling.

5 Claims, 2 Drawing Sheets

SOLID STATE CELL ELECTROLYTE

This application is a continuation of application Ser. No. 421,085, filed Oct. 13, 1989, which is a continuation of application Ser. No. 151,152, filed Feb. 1, 1988, both now abandoned.

This invention relates to polymer electrolytes and their use in solid state electrochemical cells.

A solid state electrochemical cell for use in a secondary battery and comprising a Li or Li-based anode, a lithium ion-conducting polymeric electrolyte, and a cathode based on an insertion electrode material such as $V_6O_{13}$, $V_2O_5$ and $TiS_2$ is known and is described in, for example European Patent Application Publication No. 0 013 199 (corresponding to U.S. Pat. No. 4 303 748) and UK Patent Specification No 2 139 410A (corresponding to U.S. Pat. No. 4 547 440). An insertion electrode material is a material capable of acting as a cathode in such a cell by virtue of its ability to allow certain ions to be physically inserted into its structure during discharging of the cell and to be subsequently removed therefrom during charging thereof. Thus, the overall cell reaction when the electrode material is $V_6O_{13}$ is as follows:

$$xLi^+ + xe^- + V_6O_{13} \rightleftharpoons Li_xV_6O_{13}$$

for x in the range 0 to 8.

It is also known from the above-mentioned publications that the cathode may be constructed as a composite structure comprising the insertion electrode material, polymer electrolyte material and, if required, an electronically conducting medium such as graphite. This is to achieve high active cathode utilisations at realistic current densities.

Examples of the polymeric electrolyte in the known cell are complexes of plastic macromolecular materials such as poly(ethene oxide), commonly known as poly(ethylene oxide) and referred to herein as PEO, and poly(propene oxide), commonly known as poly(propylene oxide), with a lithium salt, the anion of which may, for example be $I^-$, $Br^-$, $ClO_4^-$, $SCN^-$ or $F_3CSO_3^-$.

However, an operating problem of the known cells is that, for high rate applications, they work satisfactorily at elevated temperatures only, eg 100° C. to 130° C. This is because the polymer changes from an amorphous form to a crystalline form as its temperature is lowered, which amorphous form is primarily responsible for its ability to conduct lithium ions. Hence, the ionic conductivity of the polymeric electrolyte is not high enough for the cell to operate satisfactorily at high rates at ambient or near ambient temperatures whereas, at elevated temperatures, conductivity is sufficient; for example at about 100° C. $(PEO)_xLiF_3CSO_3$ complexes (where x is in the range from 9 to 20) have ionic conductivities of about $10^{-4}$ ohm$^{-1}$ cm$^{-1}$.

European Patent Application Publication No 0 145 498 describes making polymeric electrolytes (such as the above) having plasticisers incorporated therein by melt extrusion and converting them into films. The electrolytes are stated therein to have satisfactory ambient or near ambient temperature conductivity. Thus, Example 7 thereof states that a film of $(PEO)LiF_3CSO_3$ having 30% w/w propylene carbonate therein has a conductivity at 23° C. of $1.84 \times 10^{-4}$ ohm$^{-1}$ cm$^{-1}$ and that a similar film with ethylene carbonate replacing the propylene carbonate has a conductivity at 23° C. of $1.45 \times 10^{-4}$ ohm$^{-1}$ cm$^{-1}$. However, the use of plasticisers as described above does not satisfactorily solve the above-mentioned operating problems of solid state electrochemical cells. For example, ethylene carbonate crystallises with time causing the cell performance to deteriorate after a small number of charge/discharge cycles.

The invention makes use of materials such as propylene carbonate and ethylene carbonate but in a way which ameliorates the above-mentioned problems. Thus, the invention includes a solid polymer electrolyte comprising a complex of a solid polymer and an alkali metal salt, which polymer is capable of forming donor-:acceptor type bonds with alkali metal ions and is capable of conducting alkali metal ions, wherein the complex is associated with a mixture of more than one substituted or unsubstituted 1,3-dioxolane-2-ones.

Polymer electrolytes of the invention have been found to possess satisfactory ionic conductivities, for example $10^{-3}$ to $10^{-4}$ ohm$^{-1}$ cm$^{-1}$ at ambient temperature (eg 15° C. to 30° C.) as well as at elevated temperature. Also, and very importantly, rechargeable solid state electrochemical cells incorporating polymer electrolytes of the invention have been found to substantially maintain their discharge capacity at ambient temperature after many charge/discharge cycles.

A possible explanation for the above-mentioned findings is that the mixture is such that (e.g. in terms of its physical properties or composition or both) that it either lowers the temperature at which the polymer undergoes a transition from an amorphous form to a crystalline form or substantially eliminates the presence of a crystalline form of the polymer in the polymer electrolyte. For example, in the later respect, it has been found that when a film of the polymer electrolyte is cast from solution in acetonitrile, the film remains in an amorphous form and does not crystallise as the solvent evaporates. However, if certain examples of polymer electrolyte according to the invention are cooled below −10° C., crystalline material is found to form, which material melts at about 20° C.

The polymer electrolyte of the invention may be used in either or both of the electrolyte as such and the composite cathode of a solid state electrochemical cell.

Examples of polymers and alkali metal salts that may be used are those known in the art and such as referred to above. The polymer may be a homopolymer or a copolymer or both; a preferred polymer is PEO. A preferred alkali metal is lithium and a preferred alkali metal salt is $LiClO_4$.

Preferred 1,3-dioxolane-2-ones, also called alkylene carbonates, are ethylene carbonate and propylene carbonate, where a mixture of ethylene carbonate and propylene carbonate is particularly preferred. More particularly it has been found that a solid polymer electrolyte of the present invention, the molar ratios of whose constituents are represented by the general formula (I) below are especially useful:

$$[PEO_a \cdot [xEC : yPC]_b]_n \cdot LiX \qquad (I)$$

where
PEO represents poly(ethene oxide)
EC represents ethylene carbonate
PC represents propylene carbonate
and each of a, b, x, y and n is finite and represents a molar quantity, and X is an anion.

Moreover, a number of electrolytes of the formula (I) where $a=b=1$ has been investigated and it has been found that particularly advantageous results may be obtained when the ratio of EC to PC is 2:2 (i.e. $x=y=2$), $n=20$, and X is $ClO_4^-$. Thus, a preferred electrolyte within the formula (I) may be represented by the formula (II) below:

$$[PEO : [2EC : 2PC]]_{20}:LiClO_4 \qquad (II)$$

where PEO, EC and PC are defined as above and all numbers represent molar quantities. An electrolyte of the formula (II) has been found to possess an acceptable ionic conductivity within the temperature range of $-40°$ C. to $+70°$ C. as will be illustrated in the example herein and is completely amorphous within the range of $-40°$ C. to $+100°$ C.

Also, another example of a noteworthy electrolyte within the formula (I) may be represented by the formula (III) below:

$$[PEO : [3EC : PC]]_{20}: LiClO_4 \qquad (III)$$

where PEO, EC and PC are defined as above and all numbers represent molar quantities.

Preferably, a polymer electrolyte of the invention to be used as the electrolyte as such in a solid-state cell contains more of the mixture of 1,3-dioxolane-2-ones than a polymer electrolyte of the invention to be used in the composite cathode.

The polymer electrolytes of the invention may be made by methods known in the art such as casting onto release paper in the form of a film from a solution thereof using a doctor blade. The resulting film is, however, sticky and therefore less easy to handle than prior art polymer electrolyte films. It may therefore have to be removed by a transfer technique, for example by contacting it with a cathode component, or cast directly onto other cell components, viz the cathode or the anode. Its physical properties may, however, be improved by a filler in the form, for example of inorganic powders or fibres.

The invention also includes a composite cathode material comprising a solid polymer electrolyte according to the invention in association with an electrode material.

The invention further includes a solid-state electrochemical cell comprising an alkali metal or alkali metal-based anode; solid polymer electrolyte comprising a complex of a solid polymer and an alkali metal salt, which polymer is capable of forming donor-acceptor type bonds with alkali metal ions and is capable of conducting alkali metal ions; and a cathode, the electrolyte being an electrolyte according to the invention or the cathode including a composite cathode material according to the invention or both. The cell may, for example, be made in the form of layers, such as films of the anode, electrolyte and cathode, constituting a flexible sandwich arrangement. This may be done, for example by stacking, rolling or folding flexible layers into a required configuration, which is then contained in a flexible package or casing and terminals provided so that the cell can be used.

Figure 2:
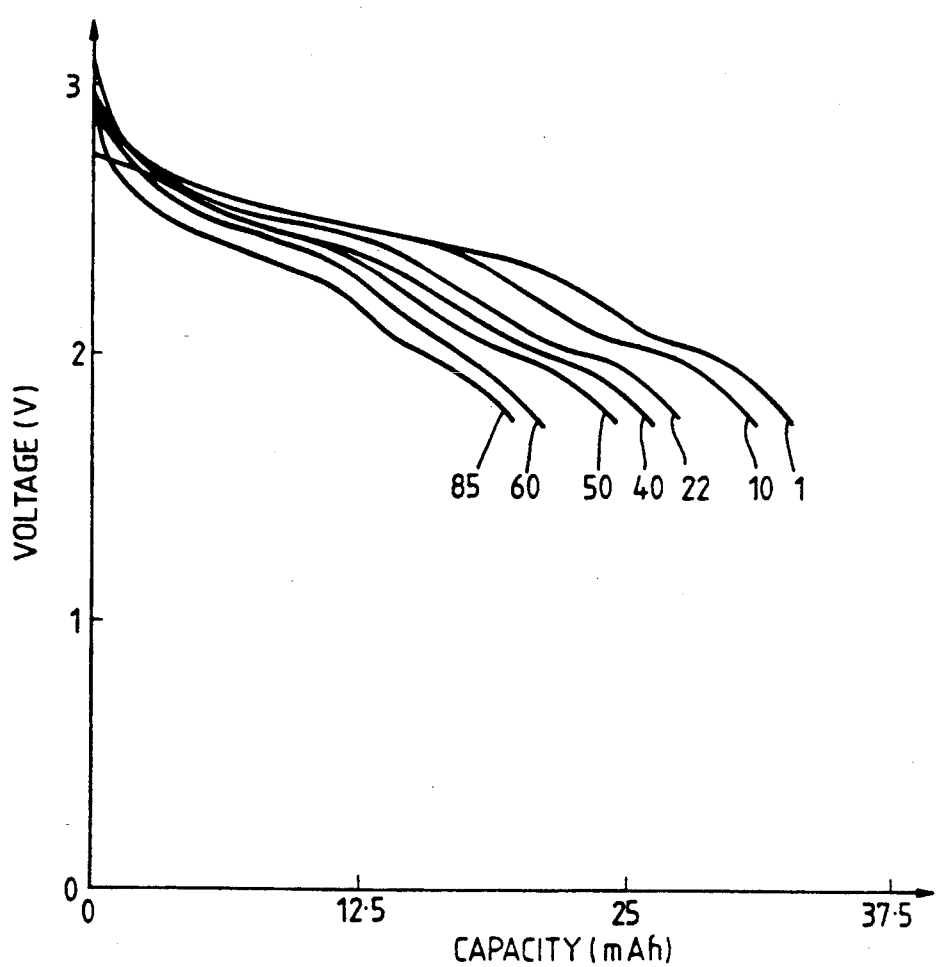
Figure 3:
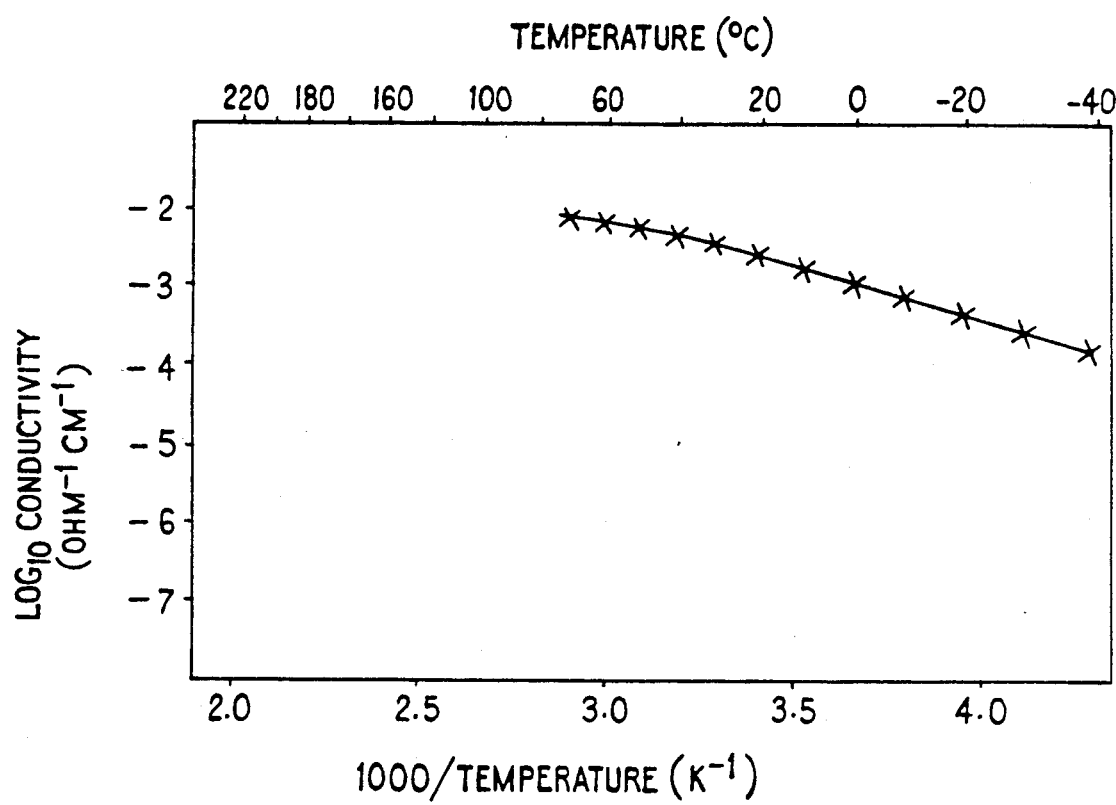

The invention will now be specifically described in the following examples. Comparative experiments which are not examples of ways of carrying out the invention will also be described. Compositions given in the examples and experiments are approximate. Reference will be made to the accompanying drawings wherein FIG. 1 is a graph showing the relationship between the ionic conductivity of a polymer electrolyte of the invention and temperature;

FIG. 2 is a graph showing the relationship between cell voltage and capacity when a cell of the invention is discharged; the graph shows the relationship after the cell has been subjected to indicated numbers of charge/discharge cycles; and FIG. 3 is a graph showing the relationship between the ionic conductivity of a polymer electrolyte of the invention and temperature.

EXAMPLE 1

Preparation and Testing of Polymer Electrolyte

A solution of PEO, $LiClO_4$, ethylene carbonate and propylene carbonate in acetonitrile was cast onto release paper and the solvent allowed to evaporate to give a polymer electrolyte film (thickness 50–100 $\mu$m). The composition of the solution was such that the composition of the film was: $(PEO)_{10}LiClO_4$ plus 70% by weight of ethylene carbonate and propylene carbonate together where the ratio of ethylene carbonate to propylene carbonate was 3:1 (weight:weight).

The ionic conductivity of the film was measured at different temperatures. The results are summarised in FIG. 1 from which it will be seen that satisfactory values were obtained in the temperature range of $-20°$ C. to 70° C.

Preparation of Composite Cathode

A solution of PEO, $LiClO_4$, ethylene carbonate and propylene carbonate in acetonitrile was prepared and $V_6O_{13}$ and acetylene black dispersed therein. The dispersion was applied to a nickel foil current collector and the solvent removed to give a flexible composite film. The composition of the dispersion was such that the composition of the resulting composite cathode by volume was approximately 50% polymer complex, 45% $V_6O_{13}$ and 5% acetylene black and that the composition of the polymer complex was: $(PEO)_{10}LiClO_4$, plus 50% by weight of ethylene carbonate and propylene carbonate together where the ratio of ethylene carbonate to propylene carbonate was 3:1 (weight:weight). The specific capacity of the composite cathode was approximately 1 mAh $cm^{-2}$.

Preparation and Testing of Electrochemical Cells

The polymer electrolyte was transferred to the composite cathode by contacting it therewith and peeling away the release paper. A lithium metal foil anode (thickness 150 $\mu$m) was rolled into expanded nickel sheet (for providing electrical contact) and contacted with the combined electrolyte/composite cathode so that the electrolyte was interposed between the anode and the cathode. The resulting cell which had an active surface area of c. 50 $cm^2$ was encapsulated by heat sealing in a plastic envelope made of an inner layer of polyethylene, an outer layer of polypropylene and an interposed aluminium foil layer to give a thin flexible cell. Electrical connections were provided through the heat sealed perimeter of the envelope.

The cell was cycled at ambient temperature (15° C. -25° C.) under constant current conditions of 0.2 mA $cm^{-2}$ (discharge) and 0.1 mA $cm^{-2}$ (charge) between voltage limits of 3.25 V and 1.7 V. FIG. 2 illustrates the cell discharge characteristics as a function of cycle number. The initial capacity corresponds to approximately 70% nominal cathode utilization and approximately 60% of this capacity is available after 85 cycles.

COMPARATIVE EXPERIMENT A

An electrochemical cell similar to that described in Example 1 was made but wherein the polymer electrolyte in the electrolyte as such and in the composite cathode had the composition: $(PEO)_{20}LiClO_4$ plus 50% by weight of ethylene carbonate, i.e. no propylene carbonate. The electrolyte was found to have an ambient temperature (c. 25° C.) ionic conductivity approaching $10^{-4}$ ohm cm$^{-1}$. However, cell performance at 25° C. was poor. When cycled at 50° C. at 0.2/0.1 mA cm$^{-2}$ discharge/ charge current densities between 2.0 and 3.25 volts, cathode utilizations between 25 and 35% only of nominal were achieved over 13 cycles.

COMPARATIVE EXPERIMENT B

An electrochemical cell similar to that described in Comparative Experiment A was made but wherein the polymer electrolyte in the electrolyte as such had the composition: $(PEO)_{10}LiClO_4$ plus 70% by weight of ethylene carbonate, i.e. no propylene carbonate.

When tested at ambient temperature at 0.2 mA cm$^{-2}$ discharge current density to a limit of 2 V, the cell gave about 80% nominal cathode utilization on the first discharge but would not charge.

COMPARATIVE EXPERIMENT C

An electrochemical cell similar to that described in Comparative Experiment A was made but wherein the polymer electrolyte in the electrolyte as such and in the composite cathode had the composition : $(PEO)_{10}LiClO_4$ plus 50% by weight of propylene carbonate, i.e. no ethylene carbonate.

When the cell was tested at around 25° C., maximum cathode utilizations of around 35% nominal could only be obtained at low discharge current densities c. 0.01 mAcm$^{-2}$. These declined to less than 1% after 20 to 30 cycles between 3.25 V and 1.7 V limits.

When the cell was tested at 50° C., 50% of nominal cathode capacity could be obtained at a discharge capacity of 0.25 mA cm$^{-2}$ but capacity was again observed to decline on cycling.

The results of Comparative Experiments A, B and C show that a high electrolyte conductivity arising from the use of ethylene carbonate or propylene carbonate singly does not necessarily ensure good cell performance especially after extended life and cycling.

EXAMPLE 2

A solution of PEO, LiClO$_4$, ethylene carbonate and propylene carbonate in acetonitrile was cast onto release paper and the solvent allowed to evaporate to give a polymer electrolyte film (thickness ~ 50 micrometers). The composition of the solution was such that the composition of the film was:

$$[PEO : [2EC : 2PC]]_{20} : LiClO_4$$

i.e. of the formula (II) herein.

The ionic conductivity of the film was measured as a function of temperature using the standard complex impedance method via impedance data collected by a Solartron 1254 FRA and 1286 ECI combination.

The results are summarised in the FIG. 3 of the accompanying drawings from which it will be seen that ionic conductivity rises from about $10^{-4}$ ohm$^{-1}$cm$^{-1}$ at $-40°$ C. to about $10^{-2}$ ohm$^{-1}$cm$^{-1}$ at $+70°$ C.

I claim:

1. A solid state electrochemical cell comprising a lithium-containing anode, a cathode, and a solid polymer electrolyte comprising a complex of poly(ethene oxide) and a lithium salt which is capable of conducting lithium ions, wherein said complex of poly(ethene oxide) is associated with a mixture comprising ethylene carbonate and propylene carbonate and wherein the cell can deliver 60 percent of its initial cathode utilization after discharging and charging for 85 cycles.

2. The solid state electrochemical cell of claim 1 wherein the molar ratios of the constituents of the solid polymer electrolyte are represented by the general formula (I) below:

$$PEO_1 : [xEC : yPC]_b \; _n : LiX \qquad (I)$$

where
PEO represents poly(ethene oxide)
EC represents ethylene carbonate
PC represents propylene carbonate
and each of a, b, x, y and n is finite and represents a molar quantity, and X is an anion.

3. The solid electrochemical cell of claim 1 wherein the molar ratios of the constituents therein are represented by the formula (II) below:

$$PEO : [2EC : 2PC]_{20} : LiClO_4 \qquad (II)$$

where PEO, EC and PC are defined as in claim 9 and the numbers represent molar quantities.

4. The solid state electrochemical cell of claim 1 wherein the polymer electrolyte has an ionic conductivity of $10^{-3}$ to $10^{-4}$ ohms$^{-1}$ cm$^{-1}$ at temperatures between 15° and 30° C.

5. A solid state electrochemical cell of claim 1 wherein the ratio of ethylene carbonate to propylene carbonate is 3:1 by weight.

* * * * *